United States Patent [19]
Vana, Jr. et al.

[11] Patent Number: 5,245,134
[45] Date of Patent: Sep. 14, 1993

[54] POLYTETRAFLUOROETHYLENE MULTICONDUCTOR CABLE AND PROCESS FOR MANUFACTURE THEREOF

[75] Inventors: James G. Vana, Jr., Austin; Paul R. Warren, Round Rock; Michael L. Eckert, Manor, all of Tex.

[73] Assignee: W. L. Gore & Associates, Inc., Newark, Del.

[21] Appl. No.: 747,315

[22] Filed: Aug. 20, 1991

Related U.S. Application Data

[63] Continuation-in-part of Ser. No. 574,704, Aug. 29, 1990.

[51] Int. Cl.⁵ .................. H01B 7/08; H01B 11/18
[52] U.S. Cl. ........................ 174/117 F; 156/47; 156/55; 174/36; 174/112; 385/110; 385/112; 385/114
[58] Field of Search ......... 174/117 F, 117 FF, 72 A, 174/112, 36; 156/47, 55; 385/110, 112, 114

[56] References Cited

U.S. PATENT DOCUMENTS

| | | | |
|---|---|---|---|
| 3,082,292 | 3/1963 | Gore | 174/117 F |
| 3,586,555 | 6/1971 | Sager | 156/55 |
| 3,649,434 | 3/1972 | Mortenson | 174/117 F |
| 3,736,217 | 5/1973 | Nagao . | |
| 3,974,016 | 8/1976 | Bondybey et al. | 156/47 X |
| 4,000,348 | 12/1976 | Harlow | 174/110 FC X |
| 4,283,448 | 8/1981 | Bowman | 428/34.9 |
| 4,356,345 | 10/1982 | Gonia | 174/117 F |
| 4,359,597 | 11/1982 | Paquin et al. | 174/34 |
| 4,368,214 | 1/1983 | Gillette | 174/117 F X |
| 4,381,208 | 4/1983 | Baverstock | 174/72 A X |
| 4,412,092 | 10/1983 | Hansell | 174/36 |
| 4,443,657 | 4/1984 | Hill et al. | 174/110 FC |
| 4,529,564 | 7/1985 | Harlow | 174/110 FC X |
| 4,645,868 | 2/1987 | Suzuki | 174/117 F |
| 4,701,576 | 10/1987 | Wada et al. | 174/117 F |
| 4,730,088 | 3/1988 | Suzuki | 174/117 F X |
| 4,741,594 | 5/1988 | Suzuki . | |
| 4,826,725 | 5/1989 | Harlow | 174/110 FC X |
| 4,837,405 | 6/1989 | Bonjour et al. | 174/36 |
| 5,053,583 | 10/1991 | Miller et al. | 174/36 |

FOREIGN PATENT DOCUMENTS

| | | |
|---|---|---|
| 1937372 | 4/1966 | Fed. Rep. of Germany . |
| 2203531 | 7/1973 | Fed. Rep. of Germany . |
| 8405418 | 9/1984 | Fed. Rep. of Germany . |
| 2036798 | 12/1970 | France . |
| 298013 | 4/1990 | Japan . |

*Primary Examiner*—Morris H. Nimmo
*Attorney, Agent, or Firm*—Dena Meyer Weker

[57] ABSTRACT

A mutliconductor cable having separatable insulated conductors is provided having a plurality of insulated conductors spaced apart in planar relationship and at least the exterior layer is comprised of porous PTFE, wherein a contact area exists between adjacent exterior layers so that adjacent insulated conductors bond with each other. A multiconductor cable is also described comprising a plurality of conductors insulated in discrete clusters wherein each cluster is surrounded by an exterior layer of expanded porous PTFE which forms a bond with the adjacent exterior layer. A multiconductor cable comprising coaxial cables which are bonded together by the exterior layer of expanded porous PTFE is also described.

A process of making the multiconductor cable is also described.

13 Claims, 7 Drawing Sheets

FIG. 12

# POLYTETRAFLUOROETHYLENE MULTICONDUCTOR CABLE AND PROCESS FOR MANUFACTURE THEREOF

RELATED APPLICATION

This application is a continuation-in-part of Ser. No. 07/574,704, filed Aug. 29, 1990.

FIELD OF THE INVENTION

This invention relates to an improved polytetrafluoroethylene multiconductor cable and the manufacture thereof.

BACKGROUND OF THE INVENTION

During the past 40 years, the development of increasingly sophisticated computer hardware has led to a need for improved electronic cables capable of carrying more signals at high frequencies and at lower signal levels than ever before. In addition, increased sophistication of automated test equipment, aircraft, weapon systems, and telecommunications equipment such as satellites have increased the demand for high signal density multiconductor cable that is increasingly miniaturized and at the same time lighter in weight and capable of withstanding extreme temperature variations.

In these sophisticated systems, polytetrafluoroethylene (hereinafter PTFE) is preferred as an insulation because of its excellent dielectric properties, and thermal and chemical resistance. PTFE is also desirable as an insulation because of its ability to maintain mechanical integrity over a long period of time.

Typically the manufacture of flat multiconductor or ribbon cables require lamination with films, woven threads, or thermoplastic adhesives such as FEP (a copolymer of tetrafluoroethylene and hexafluoropropylene) to hold the multiconductors together and maintain their position in a flat plane.

Multiconductor flat or ribbon cable having at least one laminating film of PTFE insulation is known in the art. For example, U.S. Pat. No. 4,000,348 discloses a process to make flat multiconductor cable involving the lamination of fluorocarbon and similar high temperature resins. In addition, the patent describes a process for bonding and sintering unsintered extruded polytetrafluoroethylene (PTFE) containing a multiconductor cable with thermoplastic fluorocarbon resins and in turn to other materials including PTFE.

Alternatively, U.S. Pat. No. 4,443,657 discloses a cable construction having a plurality of conductors spaced apart in a planar relationship; a plurality of inner layers each surrounding one of the conductors, the inner layers formed of porous substantially unsintered polytetrafluoroethylene; a plurality of outer layers each substantially surrounding one of the inner layers, the outer layer being formed of impermeable sintered PTFE; and a plurality of webs, each connecting an outer layer to an adjacent outer layer, each of the webs being formed of impermeable sintered PTFE.

These products have limited functionality because of the limited ability to route individual conductors. The tapes, adhesives, and webs necessary to hold the multiconductor cable together also increase the weight of the cable as well as limit the functionality of the cable to certain temperature ranges where the bonding properties degrade.

There is a need for multiconductor cable that is capable of functioning over a wide temperature range and that is also lighter weight standard PTFE ribbon cable. There is also a need for a multiconductor cable construction where access to individual conductors is easily gained without disruption of the remaining conductors of the cable. Finally, it is also desired that previously achieved benefits from improvements in multiconductor cable construction such as flexibility and electrical performance are maintained.

SUMMARY OF THE INVENTION

A multiconductor cable is described having a plurality of conductors spaced apart in planar relationship and at least one layer of porous PTFE surrounding each of said conductors as an exterior layer wherein a contact area exists between adjacent exterior layers in which the porous PTFE unites with the porous PTFE of the adjacent exterior layer. The individual conductors may also have several layers of insulation surrounding the conductor and a final exterior layer of porous PTFE then surrounds the insulation. The conductors may be any electrically conductive material, and/or electromagnetic signal transmission fibers. The individual conductors may be color coded.

Alternatively, additional embodiments include a multiconductor cable having a plurality of conductors insulated in discrete clusters so that each cluster has two or more conductors surrounded by either an exterior layer of expanded porous PTFE or a first layer of insulation and then an exterior layer of expanded porous PTFE. At least one of the individual conductors comprising each cluster should be insulated prior to the exterior layer of expanded porous PTFE being applied. Additionally, the conductors of a cluster may be twisted together before the exterior layer is applied. Multiple clusters are then united by bonding the exterior layers of expanded porous PTFE together.

Another embodiment includes a multiconductor cable comprising a plurality of coaxial cables in which each coaxial cable comprises a conductor surrounded by a dielectric insulating material, a second conductor surrounding the dielectric material and surrounding the second conductor, either an exterior layer of expanded porous PTFE or one or more insulating layers then surrounding by expanded porous PTFE. Once again, the coaxial cables are united by a bond formed between the exterior layers of expanded porous PTFE of adjacent cables.

A process to make multiconductor cable is also described having the steps of individually surrounding a plurality of conductors with an exterior layer of porous PTFE; aligning said conductors in parallel; pulling said parallel conductors over a curved shoe having a concave groove so that the conductors migrate towards the center of the groove wherein exterior layers of adjacent conductors are forced in contact with each other and are simultaneously heat treated to at least the crystalline melt point of the exterior layer so that a bond forms.

Processes to make the clustered multiconductor cable and multiconductor coaxial cable are also provided.

DETAILED DESCRIPTION OF PREFERRED EMBODIMENTS

The cable of the present invention provides for a plurality of conductors, each conductor insulated or surrounded by a least one outer layer of porous polytetrafluoroethylene (PTFE) preferably porous expanded PTFE and aligned in a planar relationship to form a flat multiconductor cable. The individual conductors with layers of porous PTFE surrounding them are attached to one another by bonds formed between adjacent layers of porous PTFE. The bonds formed between the porous PTFE layers thus eliminates the need for use of adhesives or tapes to bond individual conductors and insulation together. Alternatively, clusters of two or more conductors or coaxial cables may be used instead of single conductors.

The resulting cables are lighter than conventional cables. The individual conductors of the cable are also easily separated for stripping, termination and routing. Because no adhesives are used, the inventive cable is not limited to temperature ranges often required for cables where adhesives are used. The multiconductor cable may also be color-coded so that individual conductors may be surrounded by porous PTFE containing a pigment. The cable also maintains desirable signal transmitting properties.

The bond strength between the individual conductors depends on the contract area between the conductors. The contact are is the space where the porous PTFE surrounding adjacent conductors are in intimate contact and adhere together along the full length of the conductors. As can be seen from FIG. 1, the contact area is shown by the contact plane "y" and the length of the insulated conductor "L".

The contact area is proportional to the size of the wire and is preferably constructed to have dimensions which fall within the following range:

$10\% \leq y/D \leq 70\%$ preferably $20\% \leq y/D \leq 30\%$ where y is the contact plane and D is the overall diameter of the insulated conductor. Both parameters are shown in the cross-sectional view of the multiconductor cable depicted in FIG. 2. Typically, values of contact "y" less than 0.005 inches fail to create a strong enough bond to hold the wires together. Values greater than 30%, result in geometries that are not concentric thus possibly creating stripping problems for an individual wire.

The bond strength between adjoining insulated conductors varies proportionally with the contact area. The bonding between adjacent conductors may be intermittent or continuous. In general, the greater the contact area, the greater the bond strength. The bond strength must be strong enough to hold the insulated conductors in their planar position during bonding, flexing and other types of handling. The bond strength need not be excessively high as easy separation of individual insulated conductors from the cable is desirable.

The electrical characteristics of the inventive multiconductor cable remain consistent and perform similarly to that of flat ribbon cable. In addition, geometric positioning of conductors enables a wide range of transmission line properties such as impedance and capacitance to be achieved with the inventive cable. For example, conventional cables with webs, result in a characteristic impedance of about 125 ohms. The inventive cable allows the impedance to be reduced to 100 ohms because of the closer spacing between insulated conductors.

In the final construction of the multiconductor cable, the density of the porous PTFE in the contact are may increase to greater than the initial density.

The resulting cable may also be twisted using two or more parallel bonded conductors to form a twisted assembly with matched physical and electrical properties.

Figure 9:
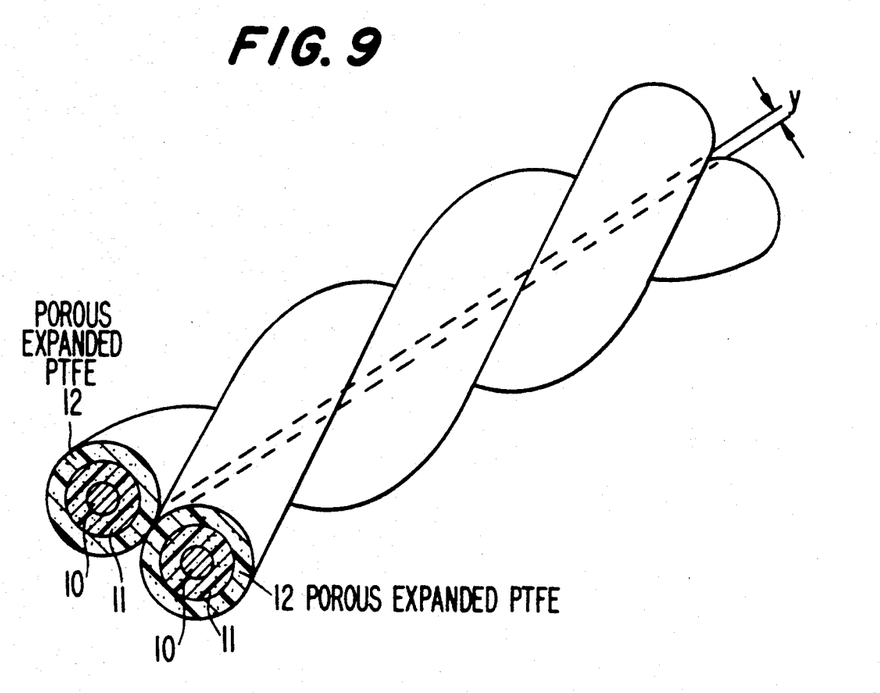
FIG. 9 is a schematic representation of an embodiment in which the bonded conductors are twisted together to form a twisted assembly.

FIG. 9 shows an illustration of a twisted assembly in which two insulated conductors 10, covered by a first layer of insulation 11 and then by an exterior layer of porous expanded PTFE 12 are bonded together and then twisted to form the assembly.

Figure 2:
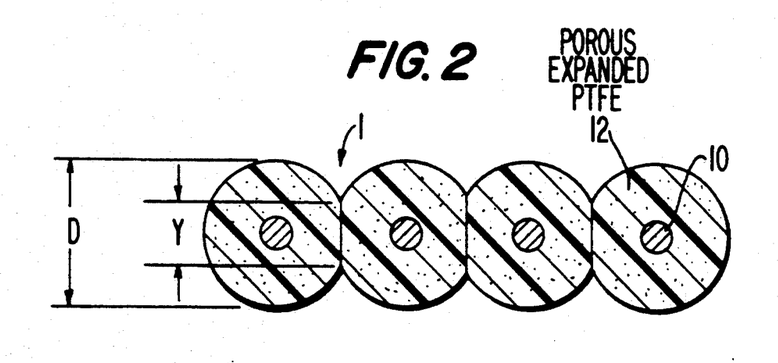
FIG. 2 is a magnified schematic cross-sectional view of another embodiment of the invention.

In accordance with the present invention, the multiconductor cable includes a plurality of conductors spaced apart in planar relationship. FIG. 2 shows a cross-section view of the multiconductor cable 1 that has a plurality of conductors 10 (four being shown in FIG. 2) positioned in parallel side-by-side relationship. The conductors 10 depicted in FIG. 2 are single strand electrical signal carrying bare copper wire. Other conductor types, such as silver plated copper, nickel plated copper or other high temperature metals and electromagnetic signal transmission fibers of glass or high temperature plastic may be used and are considered within the scope of the present invention.

Further in accordance with the present invention the improved multiconductor cable includes at least one layer of porous polytetrafluoroethylene (PTFE) 12 surrounding or insulating individual conductors 10 as its outermost layer. The porous PTFE 12 especially suitable for use in Cable 1 is porous expanded PTFE that has been produced by the process described in U.S. Pat. No. 3,953,566 and has properties described in U.S. Pat. No. 4,187,390. Preferably, the layer of porous PTFE used in the construction has not been heat treated to above its crystalline melt point (i.e. unsintered).

Figure 1:
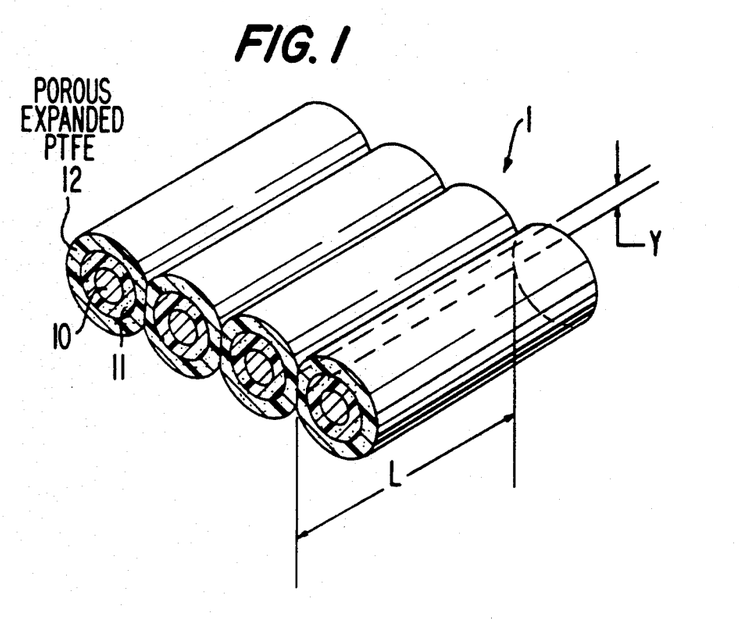
FIG. 1 is a perspective view of the inventive article.

Alternatively, and with particular reference to FIG. 1, the multiconductor cable may be comprised of individual conductors 10 that are first surrounded by conventional types of high temperature insulation 11 such as PTFE, porous PTFE, polyimide (Kapton ®), polyetheretherketone, or polyimidesiloxane and then covered by an exterior layer of porous PTFE 12 similar to that described above. The key to the invention is that the outermost (or exterior) layer of the individually insulated conductors be comprised of porous PTFE that has preferably not been heat treated.

Figure 3:
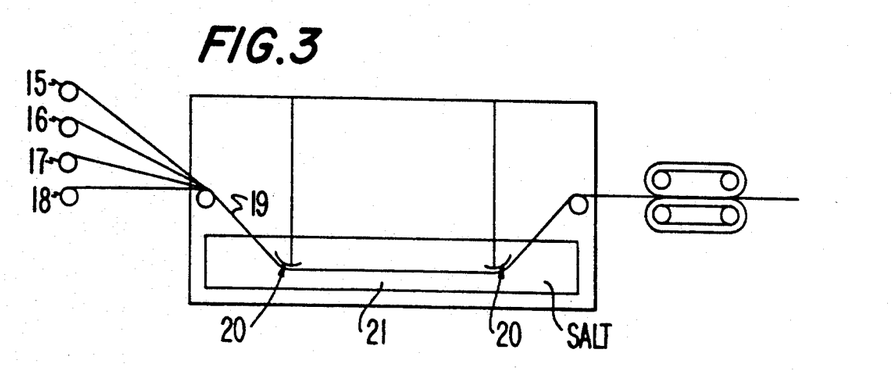
FIG. 3 is a schematic representation of the process of this invention.

Further, in accordance with the present invention, and with particular reference to FIGS. 1 and 3, the method of fabricating the improved multiconductor cable includes first insulating the bare wires with desired layers of insulation of choice. The final, exterior layer of porous PTFE is then applied to the conductor using conventional technology and is preferably wrapped around the conductor. The insulated conductors are then aligned in parallel relationship to one another in area 19 (FIG. 3). The aligned conductors are simultaneously pulled with uniform tension over a shoe having a concave groove. The process can be seen schematically in FIG. 3 where the parallel wrapped conductors 15-18 are pulled over a shoe 20.

Figure 4:
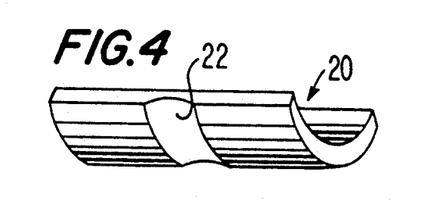
FIG. 4 is an enlarged perspective view of the shoe shown in FIG. 3.
Figure 5:
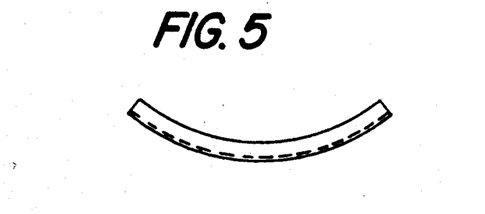
FIG. 5 is an enlarged end view of the shoe shown in FIG. 3.

The shoe 20, of which a perspective is shown in FIG. 4 has a concave region or groove 22 on the exterior side of the shoe over which the conductors pass. The groove causes the insulated conductors to migrate towards each other. FIG. 5 shows an end view of the shoe.

As the plurality of conductors are pulled over the concave shoe, the conductors merge within the concave region towards each other so that the exterior surfaces of adjacent insulated conductors contact and compress against each other.

In the particular embodiment illustrated in FIG. 3, there are two shoes in present in a salt bath 21 heated to a temperature preferably above 327° C. It is not necessary that two shoes be provided. As the insulated conductors are contacted and compressed against each other, the exterior layers of porous PTFE are simultaneously heated to above the crystalline melt point of the exterior layer of insulation thereby coalescing the layers to form bonds between adjacent insulated conductors. Although a salt bath is illustrated as the means for heating the porous PTFE, other heating techniques are also suitable.

Figure 10:
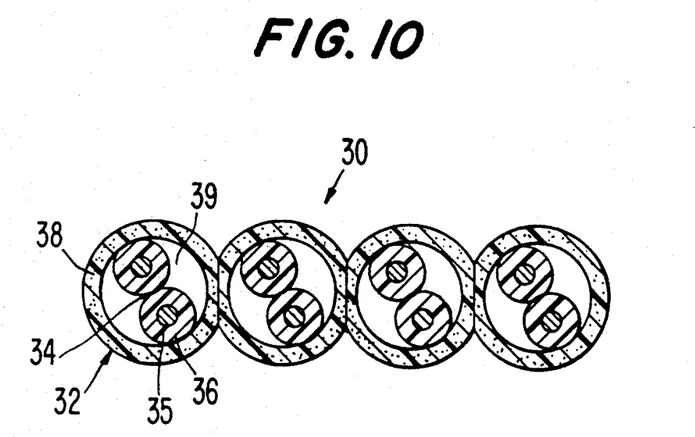
FIG. 10 is a cross-sectional view of the clustered multiconductor cable in which each cluster has two individually insulated conductors.

FIG. 10 shows a cross-sectional view of the multiconductor cable 30 having a plurality of clustered conductors (four being shown in FIG. 10) positioned in parallel side by side relationship. The individual clusters 32 shown in FIG. 10 each comprises a pair of twisted conductors 34, further in each conductor 35 is insulated with at least one layer of insulation 36. Alternatively, but not shown, a cluster may contain more than two conductors and in fact a preferable embodiment includes the clusters each having three twisted conductors. As previously described, the individual conductors comprising each cluster may be each covered with a layer of insulation 36 prior to the application of the exterior layer of expanded porous PTFE. Other embodiments but not shown may include clusters where only one of two conductors are covered with a layer of insulation.

FIG. 10 also shows that the individual clusters are each surrounded by an exterior layer of expanded porous polytetrafluoroethylene 38. Although not shown, additional layers of insulation may first surround each cluster before the outermost layer of expanded porous PTFE is applied. Although somewhat exaggerated in FIG. 10, small air gaps 39 may be formed when the exterior layers of expanded porous PTFE or plurality of layers of insulation including the exterior layer of expanded porous PTFE is applied around the twisted pair cluster as the layer(s) maintain a circumference around the cluster and do not sag or conform to the exact shape of the twists.

Figure 11:
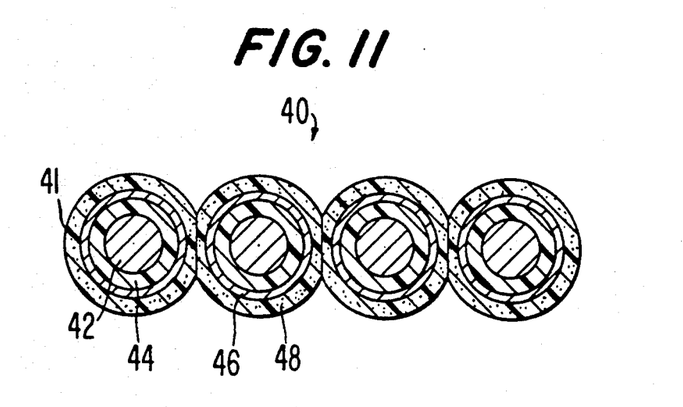
FIG. 11 is a cross-sectional view of the multiconductor coaxial cable assembly.
Figure 12:
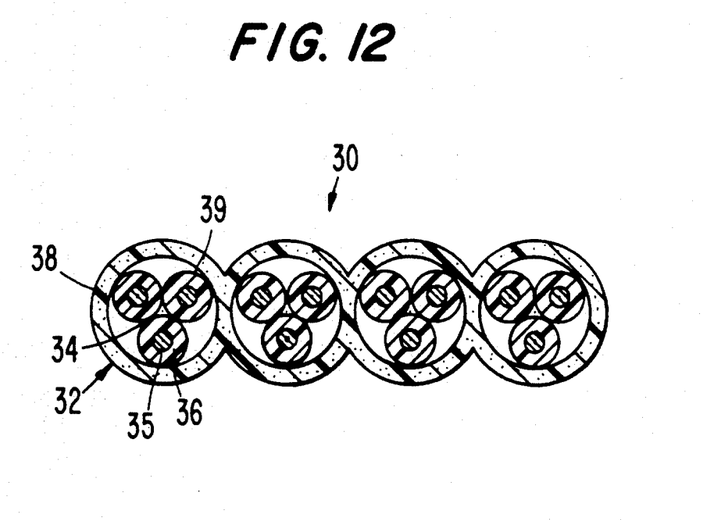
FIG. 12 is a cross-sectional view of the clustered multiconductor cable in which each cluster has three individually insulated conductors.

FIG. 11 shows a cross-sectional view of a multiconductor cable 40 having a plurality of coaxial cables (four being shown in FIG. 11) positioned in parallel side by side relationship. Each of the individual coaxial cables 41 shown in FIG. 11 is comprised of a center conductor 42, a layer of high temperature dielectric material 44, a conductive shield 46 and an exterior layer of expanded porous polytetrafluoroethylene 48. The high temperature dielectric material 44 includes materials selected from the group consisting of polytetrafluoroethylene, polyimide (Kapton ®), polyetheretherketone, polyimidesiloxane and preferably expanded porous polytetrafluoroethylene sold under the trademark GORE-TEX ®, commercially available from W. L. Gore & Associates, Inc. of Newark, Del. The conductive shield 46 may be selected from the group consisting of braided wires (woven), served wires (non-woven) that are helically-wrapped about the dielectric material, and a foil with or without a drain wire. Similar to the other embodiments, the exterior layer of expanded porous polytetrafluoroethylene serves as a "bonding agent" which forms a bond with the adjacent cables thereby forming a multiconductor coaxial cable.

In the following examples, calculations were made to derive expected physical and electrical parameters in addition to actual measurements taken on the cables after construction. The following equations were used to calculate the specified parameters:

Center Spacing = diameter of conductor + 2 ($\Sigma$ thickness of wall layers).

Bond Thickness = 0.25 × center spacing.

Bond Strength = (bond thickness)$^2$ × 0.064 oz.-/mil.$^2$ × [1.2 g/cc/2.15 g/cc.]

Impedance = 276/$\sqrt{\text{dielectric constant}}$ × log [2 × center spacing/(0.97 × conductor diameter)]

Capacitance = 1016 × $\sqrt{\text{dielectric constant}}$/Impedance

The following examples are illustrative only and are not intended to limit the scope of the present invention in any way.

EXAMPLE 1

Multiconductor Cable with AWG 24(19/36) Conductors

Figure 6:
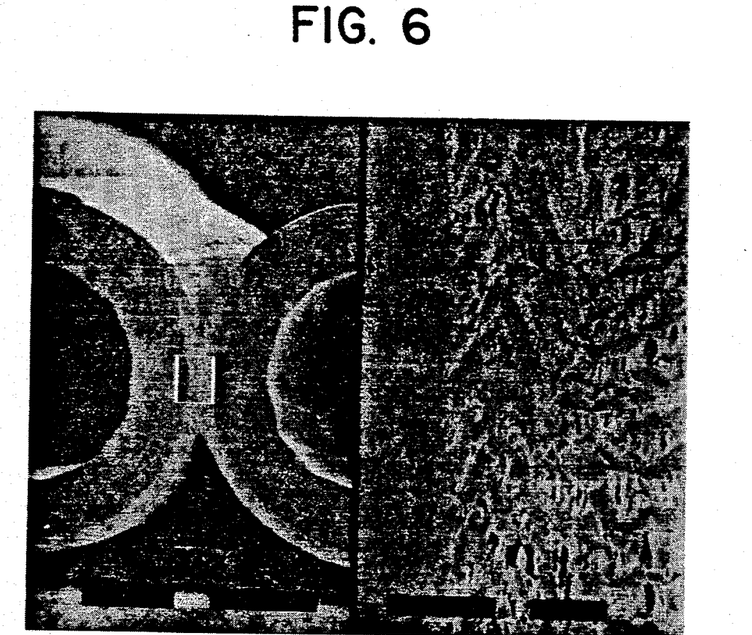
FIG. 6 is a photomicrograph (left side) of a cross-section of the multiconductor cable described in Example 1 taken at 50× magnification and a photomicrograph (right side) of the contact area of the cross-section taken at 1000× magnification of the cable.

Five AWG 24(19/36) silver plated copper conductors were used for this example. Each conductor was preinsulated with 0.006 inches of PTFE and then each helically wrapped with a layer of unsintered expanded PTFE. The wires were pulled side by side over a concave shoe in a salt bath at a temperature of above 370°0 C. Adjacent wires were forced together due to the combined effects of their tensions and the profile of the shoe. Transverse forces caused the layers of expanded PTFE of adjacent wires to compress, changing the geometry of the contact area from a line to a plane. Simultaneously, the heat of the salt bath caused the expanded PTFE of adjacent wires to coalesce and form a bond strength necessary to keep the wires held together in a single plane. A continuous transverse force was provided to the assembly during the heat treatment to ensure a large contact area between wires and to compensate for any shrinkage of the expanded PTFE. The left side of FIG. 6 is a photo micrograph of a cross-section of two adjacent wires in the cable assembly taken at 50× magnification. The photo on the right (FIG. 6) shows a close-up (at 500× magnification) of the contact area designated by the rectangle shown on the left photo.

The following physical and electrical properties were both estimated by calculation and actually measured:

| Wire Description (single wire measurement - 5 wires in cable) | | |
| --- | --- | --- |
| 25 mil diameter conductor 6 mil wall of PTFE 1.6 mil wall of expanded porous PTFE | | |
| Physical Properties | Expected | Actual |
| Center Spacing (mils) | 40.2 | 39.8 +/− 2.0 |
| Bond Thickness "y" (mils) | 10.1 | 10.6$^a$ +/− 3.0 |
| Bond Strength (oz.) | 3.6 | 3.0$^b$ =/+ 0.5 |
| Electrical Properties | Expected | Actual |
| Impedance (ohms) | 114 | 100 |
| Capacitance (pf/ft) | 11 | 10.5 |
| Dielectric Constant | 1.6 | 1.5 |

$^a$Actual Bond Thickness measurements were made with an optical microscope at 50 X magnification equipped with an x-y table and a digital readout. Thirty-two measurements were taken and averaged to determine bond thickness.
$^b$Actual Bond Strength measurements were taken with a spring scale, in which a force was applied to separate a single conductor from the remaining assembly.

EXAMPLE 2

Multiconductor Cable with AWG 30(19/42) Conductors

Twelve AWG 30(19/42) silver plated copper conductors were used for this example. Each conductor was preinsulated with 0.006 inches of PTFE and then each helically wrapped with a layer of unsintered expanded PTFE. The wires were pulled side by side over a concave shoe in a salt bath at a temperature of above 370° C. Adjacent wires were forced together due to the combined effects of their tensions and the profile of the shoe. Transverse forces caused the layers of expanded PTFE of adjacent wires to compress, changing the geometry of the contact area from a line to a plane. Simultaneously, the heat of the salt bath caused the expanded PTFE of adjacent wires to coalesce and form a bond strength necessary to keep the wires held together in a single plane. A continuous transverse force was provided to the assembly during heat treatment to ensure a large contact area between wires and to compensate for any shrinkage of the expanded PTFE.

Figure 7:
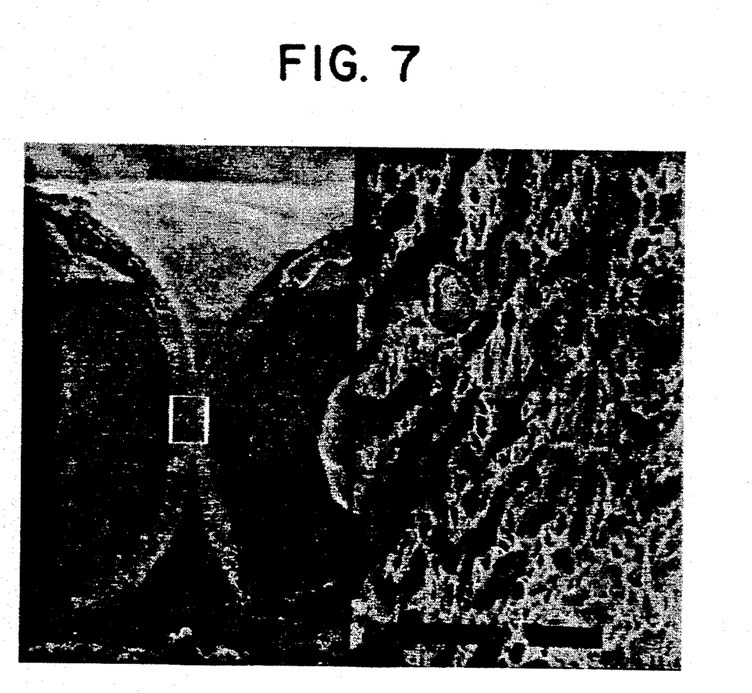
FIG. 7 is a photomicrograph (left side) of a cross-section of the cable described in Example 2 taken at 100× magnification and a photomicrograph (right side) of the contact area of the cross-section taken at 1000× magnification.

The left side of FIG. 7 is a photomicrograph of a cross-section of two adjacent wires in the cable assembly taken at 100× magnification. The photo on the right (FIG. 7) shows a close-up (at 1000× magnification) of the contact area designated by the rectangle shown on the left photo.

The following physical and electrical properties were both estimated by calculation and actually measured:

| Wire Description (single wire measurement - 12 wires in cable) | | |
| --- | --- | --- |
| 13 mil diameter conductor 6 mil wall of PTFE 1.6 mil wall of expanded porous PTFE | | |
| Physical Properties | Expected | Actual |
| Center Spacing (mils) | 28.2 | 27.2 +/− 1.0 |
| Bond Thickness "y" (mils) | 7.1 | 6.5$^a$ +/− 2.0 |
| Bond Strength (oz.) | 1.8 | 1.0$^b$ +/− 0.25 |
| Electrical Properties | Expected | Actual |
| Impedance (ohms) | 142 | 130 |
| Capacitance (pf/ft) | 9 | 8 |
| Dielectric Constant | 1.6 | 1.5 |

$^a$Actual Bond Thickness measurements were made with an optical microscope at 50 X magnification equipped with an x-y table and a digital readout. Twenty-one measurements were taken and averaged to determine bond thickness.
$^b$Actual Bond Strength measurements were taken with a spring scale, in which a force was applied to separate a single conductor from the remaining assembly.

EXAMPLE 13

Multiconductor Cable with AWG 26(7/34) Conductors

Expanded PTFE as preinsulation

Six AWG 26(7/34) silver plated copper conductors were used for this example. Each conductor was preinsulated with 0.015 inches of expanded PTFE and then each helically wrapped with a layer of unsintered expanded PTFE. The wires were pulled side by side over a concave shoe in a salt bath at a temperature of above 370° C. Adjacent wires were forced together due to the combined effects of their tension and the profile of the shoe. The transverse force caused the layer of expanded PTFE of adjacent wires to compress, changing the geometry of the contact area from a line to a plane. Simultaneously, the heat of the salt bath caused the expanded PTFE of adjacent wires to coalesce and form a bond strength necessary to keep wires held together in a single plane. A continuous transverse force was provided to the assembly during heat treatment to ensure a large contact area between wires and to compensate for the shrinkage of the expanded PTFE.

Figure 8:
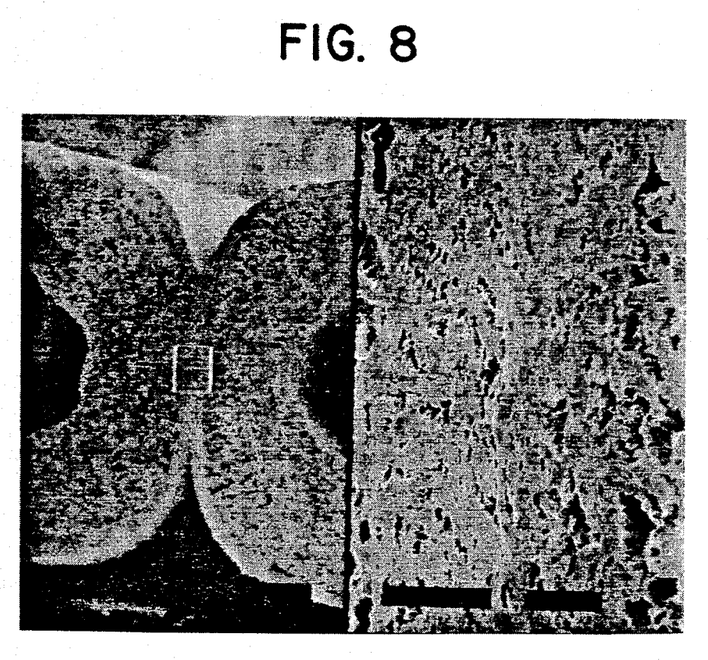
FIG. 8 is a photomicrograph (left side) of a cross-section of the cable described in Example 3 at 50× magnification and a photomicrograph (right side) of the contact area of the cross-section taken at 500× magnification.

FIG. 8 is a photomicrograph showing a cross-section of two adjacent wires in the cable assembly (left side) taken at 50×0 and a close-up of the contact area (right side) at 500× magnification designated by the rectangle shown on the left photo.

The following physical and electrical properties were both estimated by calculation and actually measured:

| Wire Description (single wire measurement - 6 wires in cable) | | |
| --- | --- | --- |
| 19 mil diameter conductor 12 mil wall of PTFE 1.6 mil wall of expanded porous PTFE | | |
| Physical Properties | Expected | Actual |
| Center Spacing (mils) | 46.2 | 43.8 +/− 2.0 |
| Bond Thickness "y" (mils) | 7.1 | 22.3$^a$ +/− 2.0 |
| Bond Strength (oz.) | 1.8 | 3$^b$ +/− .5 |
| Electrical Properties | Expected | Actual |
| Impedance (ohms) | 173 | 158 |
| Capacitance (pf/ft) | 7 | 5.5 |
| Dielectric Constant | 1.3 | 1.25 |

$^a$Actual Bond Thickness measurements were made with an optical microscope at 50 X magnification equipped with an x-y table and a digital readout. Twenty-one measurements were taken and averaged to determine bond thickness.
$^b$Actual Bond Strength measurements were taken with a spring scale, in which a force was applied to separate a single conductor from the remaining assembly.

What is claimed is:

1. A process to make multiconductor cable comprising:
   (a) individually surrounding a plurality of conductors with an exterior layer of porous polytetrafluoroethylene;
   (b) aligning said conductors in parallel;
   (c) pulling said parallel conductors with uniform tension over a shoe so that the conductors pass over a concave groove and an exterior layer of porous PTFE intimately contacts the adjacent exterior layer of porous PTFE; and
   (d) simultaneously heat treating at least the exterior layer of porous PTFE to a temperature above its crystalline melt point so that a bond forms.

2. A process to make mutliconductor cable according to claim 1 wherein the plurality of conductors are first individually surrounded by one or more layers of insulation and then surrounded by an exterior layer of expanded porous PTFE.

3. A process to make a multiconductor cable as described in claim 1 wherein individual layers of insulation and exterior layer of expanded porous PTFE are wrapped around the individual conductors.

4. A process to make a multiconductor cable as described in claim 1 wherein the heat treating of the exterior layer is performed in a salt bath.

5. A multiconductor cable where individual clusters of cables can be isolated for transmitting electromagnetic or electrical signals comprising:
   (a) a plurality of a cluster of conductors, each cluster further comprising at least two conductors, wherein at least one of said conductors in each cluster is surrounded by a layer of insulation, and wherein the plurality of clusters are spaced apart in a planar relationship; and
   (b) at least one layer of expanded porous polytetrafluoroethylene surrounds each of said clusters as an exterior layer and wherein a contact area exists between adjacent exterior layers and in which the expanded porous polytetrafluoroethylene of the exterior layer contacts the expanded porous polytetrafluoroethylene of an adjacent exterior layer and forms a bond.

6. A multiconductor cable as in claim 5 wherein the conductors comprising each cluster are twisted together.

7. A multiconductor cable as in claim 5 wherein the individual clusters comprise three conductors that are twisted together.

8. A multiconductor as in claim 5 wherein all of the conductors in each cluster are covered by a layer of insulation.

9. A multiconductor cable as in claim 5 wherein a first layer of insulation surrounds each of said clusters and an exterior layer of expanded porous polytetrafluoroethylene surrounds the first layer of insulation.

10. A multiconductor cable having a plurality of coaxial cables that can be isolated for transmitting electromagnetic or electrical signals comprising a plurality of coaxial cables, each coaxial cable comprising a center conductor, a layer of high temperature dielectric material, a conductive shield and an exterior layer of expanded porous polytetrafluoroethylene wherein a contact layer exists between adjacent exterior layers in which the expanded porous polytetrafluoroethylene of one exterior layer contacts the expanded porous polytetrafluoroethylene of the adjacent exterior layer and forms a bond.

11. A multiconductor cable as in claim 10 wherein the layer of high temperature dielectric material is selected from the group consisting of polytetrafluoroethylene, polyimide (Kapton®), polyetheretherketone, polyimidesiloxane and expanded porous polytetrafluoroethylene.

12. A multiconductor cable as in claim 10 wherein the conductive shield is selected from the group consisting of braided wires (woven), served wires (non-woven), a foil, and a foil with a drain wire.

13. A multiconductor cable of individual insulated conductors for transmitting electromagnetic or electrical signals in which individual conductors can be isolated made according to the steps comprising:
   (a) individually surrounding a plurality of conductors with an exterior layer of expanded porous polytetrafluoroethylene;
   (b) aligning said conductors in parallel;
   (c) pulling said parallel conductors with uniform tension over a shoe so that the conductors pass over a concave groove and an exterior layer of expanded porous polytetrafluoroethylene contacts the adjacent exterior layer of expanded polytetrafluoroethylene; and
   (d) heat treating at least the exterior layer of expanded porous polytetrafluoroethylene to a temperature above its crystalline melt point so that a bond forms.

* * * * *